(12) United States Patent
Winklhofer et al.

(10) Patent No.: US 9,828,937 B2
(45) Date of Patent: Nov. 28, 2017

(54) PISTON WITH A RING CARRIER AND A GLASS PISTON

(71) Applicant: AVL LIST GMBH, Graz (AT)

(72) Inventors: Ernst Winklhofer, St. Johann (AT); Christopher Huber, Graz (AT); Franz Neumann, St. Josef (AT)

(73) Assignee: AVL List GmbH, Graz (AT)

( * ) Notice: Subject to any disclaimer, the term of this patent is extended or adjusted under 35 U.S.C. 154(b) by 221 days.

(21) Appl. No.: 14/899,641

(22) PCT Filed: Jun. 5, 2014

(86) PCT No.: PCT/EP2014/061696
§ 371 (c)(1),
(2) Date: Dec. 18, 2015

(87) PCT Pub. No.: WO2014/202394
PCT Pub. Date: Dec. 24, 2014

(65) Prior Publication Data
US 2016/0153394 A1    Jun. 2, 2016

(30) Foreign Application Priority Data

Jun. 19, 2013 (AT) .................................. 50401/2013

(51) Int. Cl.
*F16J 1/00* (2006.01)
*F02F 3/00* (2006.01)
*F16J 1/01* (2006.01)
*F02F 3/28* (2006.01)

(52) U.S. Cl.
CPC .......... *F02F 3/0084* (2013.01); *F02F 3/0015* (2013.01); *F16J 1/006* (2013.01); *F16J 1/01* (2013.01); *F02F 3/285* (2013.01)

(58) Field of Classification Search
CPC ........ F02F 3/0084; F02F 3/0015; F16J 1/006; F16J 1/01
USPC .......................................................... 92/212
See application file for complete search history.

(56) References Cited

U.S. PATENT DOCUMENTS

| 2,919,688 A | 1/1960 | Bowditch |
| 4,741,253 A | 5/1988 | Ogawa et al. |
| 2011/0186002 A1 | 8/2011 | Coates |

FOREIGN PATENT DOCUMENTS

| AT | 392351 | 3/1991 |
| DE | 3440565 | 5/1986 |
| DE | 602005004482 | 2/2009 |
| EP | 1820948 | 8/2007 |

(Continued)

OTHER PUBLICATIONS

English Abstract of EP 1820948.
(Continued)

*Primary Examiner* — Michael Leslie
*Assistant Examiner* — Daniel Collins
(74) *Attorney, Agent, or Firm* — Dykema Gossett PLLC

(57) ABSTRACT

The invention relates to a piston (1), comprising a ring carrier (2) and a glass piston (3) for observing processes in a combustion chamber (B) of an internal combustion engine, wherein the glass piston (3) is placed upon the ring carrier (2) and is securely connected thereto in the region of an inner casing surface (8) of the ring carrier (2). In order to avoid overly high heat strain in the glass piston (3), the glass piston (3) is connected to the ring carrier (2) via at least one form-fit connection (20), and preferably via a force-fit connection (30).

27 Claims, 3 Drawing Sheets

(56) References Cited

FOREIGN PATENT DOCUMENTS

| JP | 5447016 | 4/1979 |
|----|---------|--------|
| JP | H10142106 | 5/1998 |
| LU | 90747 | 9/2002 |
| WO | 2005121538 | 12/2005 |

OTHER PUBLICATIONS

English Abstract of JPS 5447016.
English Abstract of DE 3440565.
English Abstract of JPH 10142106.
English Abstract of AT 392351.
English Abstract of DE 602005004482.

PISTON WITH A RING CARRIER AND A GLASS PISTON

The invention relates to a piston with a ring carrier and a glass piston for observing procedures in a combustion chamber of an internal combustion engine, wherein the glass piston is placed on the ring carrier and is fixedly connected thereto in the region of an inner lateral surface of the ring carrier.

Embodying pistons with a viewing window or glass piston to be able to visually observe procedures in the combustion chamber is known. Various pistons having glass windows or glass pistons are known from the documents JP 2009-209752 A2, EP 1 820 948 A1, DE 60 2005 004 482 T2, WO 05/121 538 A1, LU 90 747 A1, JP 10 142 106 A, AT 392 351 B, JP 54-047 016 A2, and U.S. Pat. No. 2,919,688 A. The glass windows or the glass pistons are usually connected to the ring carrier via an adhesive bond.

In the known pistons having glass windows or glass pistons, the hazard exists that thermal tensions and, as a further consequence, cracks in the glass piston can occur as a result of different thermal expansions between the glass piston, which usually consists of quartz glass or sapphire glass, and the ring carrier, which consists of steel or aluminum, which substantially reduces the service life of the piston.

The object of the invention is to avoid these disadvantages and to lengthen the service life of pistons for observing procedures in the combustion chamber of an internal combustion engine and to enable the best possible observation of the combustion procedures.

This is achieved according to the invention in that the glass piston is connected to the ring carrier via at least one form-fit connection, and preferably via a friction-locked connection.

The form-fit connection is preferably formed by the glass piston and at least one fastening ring and the friction-locked connection is preferably formed by the at least one fastening ring and the ring carrier.

The form-fit connection can have in this case at least one circumferential groove in the region of an outer lateral surface of the glass piston, in which the fastening ring, which is molded reciprocally corresponding to the circumferential groove, is arranged.

The friction-locked connection preferably has an external thread on the outer lateral surface of the fastening ring and a corresponding internal thread of the inner lateral surface of the ring carrier, wherein the fastening ring is screwed via the external thread into the internal thread of the ring carrier.

The ring carrier is preferably embodied in this case as a cylindrical element, which is embodied as internally hollow, having an inner and an outer lateral surface.

The circumferential groove can be embodied as a wedge groove, so that in the event of thermal expansion of the fastening ring, a friction-locked connection to the ring carrier is maintained. The wedge shape of the wedge groove is preferably embodied in such a manner that the force introduction into the glass piston does not exceed a critical amount. The wedge groove has first and second wedge faces facing toward one another in this case, wherein the second wedge face has a lesser distance to a gas-pressure-side front of the piston than the first wedge face. The gas-pressure-side front faces toward the combustion chamber in the installed state and gas forces are applied thereto in operation. The first wedge face spans a first wedge angle with a normal plane on the piston axis of the piston arranged in the stroke direction of the piston. The first wedge angle is preferably between approximately 30° and 70°, preferably between approximately 40° and 60°. Tests and simulations have shown particularly good results for a first wedge angle of approximately 52°. Tensile stresses in the glass can be kept within a permissible range by a first wedge angle formed in this manner, whereby cracks and fractures—in particular as a result of centripetal forces acting on the piston—can be avoided.

The fastening ring, which preferably consists of aluminum, can partially compensate for the thermal expansions of the ring carrier in relation to the glass piston and thus prevent loosening or detachment of the glass piston.

The fastening ring can be embodied in one part or multiple parts. In a one-part embodiment, for example, the fastening ring can be formed as severed—preferably completely—at least one point, whereby the elastically deforming fastening ring can be stretched over the glass piston during the mounting, until it comes to rest in the circumferential groove.

However, it is also possible that the fastening ring is formed by at least two parts, for example, ring segments, which are connected to one another in the region of joining faces facing toward one another—preferably via at least one connecting pin arranged in boreholes of the joining faces.

To avoid twisting of the fastening ring in particular during the mounting, the fastening ring is connected in a rotationally-fixed manner to the glass piston. The rotationally-fixed connection can be formed, for example, by an adhesive bond or a form-fit connection.

Aluminum or an aluminum alloy can be selected as a material for the fastening ring.

It is essential that parts which compensate for different thermal expansions are provided at contact points between the glass piston and the ring carrier. To compensate for the different thermal expansions, it is advantageous if the glass piston has a ring-shaped projection, which preferably adjoins the circumferential groove on the gas-pressure-side, wherein a ring-shaped contact surface arranged perpendicularly to the piston axis is formed in the region of the projection. The contact surface advantageously rests on a frontal ring surface of the ring carrier, wherein at least one seal element, particularly preferably a silicone seal, is preferably arranged between the glass piston and the ring carrier. The seal element seals off the interior of the ring carrier from foreign bodies. The ring-shaped contact surface can also be embodied as a circumferential groove. It is advantageous in this case if the glass piston does not rest directly on the seal element, to avoid introducing tensions into the glass.

Furthermore, it can be provided in the scope of the invention that the glass piston, on its end facing away from the combustion chamber (or on its gas-pressure-averted rear) presses against at least one expansion ring, which is supported on the ring carrier, via at least one counter holder element. The expansion ring functions in this case as a "thermal spring" and consists of a material which has a greater thermal expansion than steel, for example, of aluminum. A friction lock is caused and maintained between glass piston and the ring carrier by the expansion ring. The glass piston is thus only pressed in one direction against the flanks of the thread and therefore alternating loads and moving back and forth ("rattling") of the glass piston in the thread—which could result in tensions and fractures in the glass piston—are avoided. In this case, it can be provided in a simple embodiment that the counter holder element is formed by a shoulder protruding from the inner lateral surface of the ring carrier. The shoulder can be arranged in one or more circumferential sectors of the ring carrier. To avoid an occurrence of defined fractures, however, it is advantageous if the shoulder is formed circumferentially. The expansion ring supports itself and the glass piston on the counter holder. Thermal expansions of the glass piston are compensated for by the expansion ring.

Alternatively or additionally, it can be provided that the counter holder element is formed by a counter screw connection, which is detachably connected in a friction-locked manner to the inner lateral surface of the ring carrier. If necessary, the glass piston can be retightened after a specific operating time via the counter screw connection, to prevent the unintentional detachment thereof. The counter screw connection can be formed by a hollow screw having an external thread, which is screwed into an internal thread of the ring carrier from the side facing away from the glass piston and is pressed against the glass piston—preferably via the expansion ring.

The assembly of the glass piston and the ring carrier is performed in two steps. In a first step, the fastening ring is stretched onto the circumferential grooves of the glass piston, wherein the fastening ring is preferably glued to the glass piston. The glass piston together with fastening ring is now screwed together with the stretched-on fastening ring into the ring carrier, until the glass piston rests with its end facing away from the combustion chamber on the expansion ring. The expansion ring causes an expansion compensation between the glass piston and the ring carrier and prevents impermissibly high thermal tensions from being introduced into the glass piston. Alternatively thereto—after screwing in the glass piston—the counter screw connection can be screwed with a defined torque against the expansion ring or the glass piston. Introduction of impermissibly high tensions into the glass piston is avoided by the defined torque. The counter screw connection can be retightened if needed.

In one variant of the invention, the glass piston has a gas-pressure-side first glass piston portion, which is adjoined on the side facing away from the combustion chamber by a second glass piston portion, wherein the first glass piston portion protrudes out of the ring carrier on the gas pressure side and the second glass piston portion is located inside the ring carrier. The glass piston is arranged in the ring carrier so that the second glass piston portion—and the form-fit or friction-locked connection, for example, having a fastening ring—is located inside the ring carrier and is enclosed by the ring carrier. This arrangement has the advantage that the combustion chamber is better visible. Furthermore, this embodiment enables optimum observation of the combustion procedures in the combustion chamber and thus provides the possibility of obtaining more information about the combustion procedures. Furthermore, a durable fastening of the glass piston in the ring carrier is forced, which originates because the form-fit and friction-locked connection is arranged in the region of the second glass piston portion and therefore protected inside the ring carrier.

The invention will be explained in greater detail hereafter on the basis of the nonrestrictive exemplary embodiments, which are illustrated in the figures. In the figures.

Functionally identical parts are provided with identical reference signs in the following statements.

Figure 1:
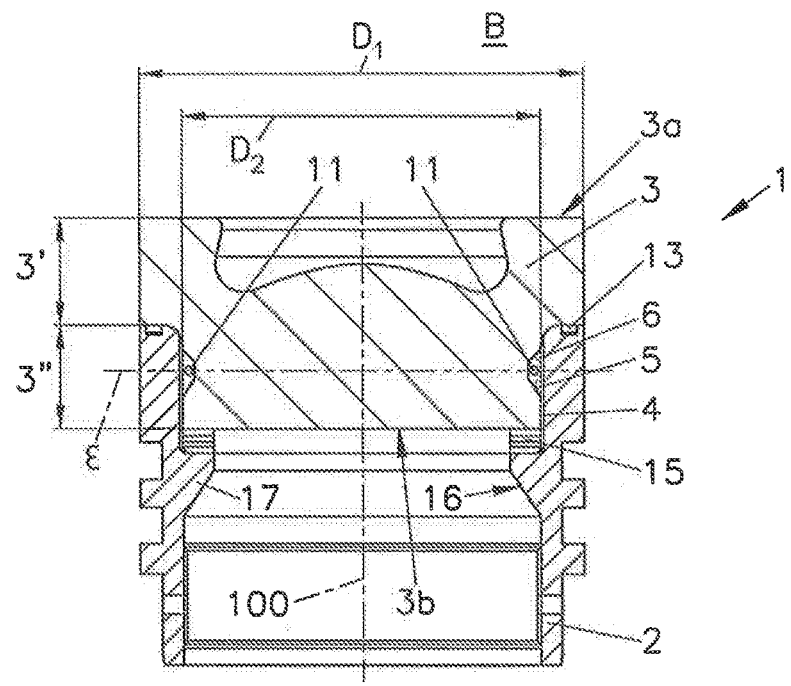
FIG. 1 shows a piston according to the invention in a meridian section in a first embodiment variant.

The piston 1 according to the invention has, in all illustrated exemplary embodiments, a ring carrier 2, which consists of steel, for example, and a glass piston 3, which is connected to the ring carrier 2, made of sapphire glass or quartz glass, which—in the state installed in the internal combustion engine—borders on a combustion chamber B identified with reference sign B. The "combustion-chamber-side", i.e., the parts and regions facing toward the combustion chamber B, are identified hereafter with "gas-pressure-side"—accordingly the glass piston 3 has a gas-pressure-side front 3a and a gas-pressure-averted rear 3b. The ring carrier 2 is embodied as substantially hollow cylindrical and has an inner and outer lateral surface.

The connection between glass piston 3 and ring carrier 2 can be embodied in greatly varying ways—for example, a form-fit connection in the form of a bayonet connection (not shown in the figures) is possible, where one or more bayonet lugs are embodied in the glass piston 3, which cooperate with corresponding bayonet guides in the ring carrier 2, or vice versa. A further embodiment variant is described hereafter.

Figure 5:
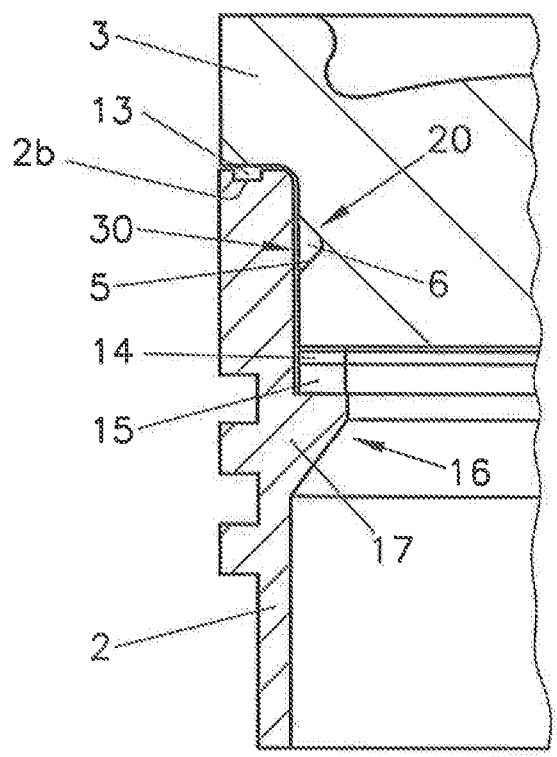
FIG. 5 shows the piston from FIG. 1 in a variant in a meridian section.

In this case, the glass piston 3 is connected to the ring carrier 2 via a form-fit connection 20 and a friction-locked connection 30 (see FIG. 5). The form-fit connection 20—which acts in a formfitting manner above all in the direction of the piston axis 100—comprises a first and a second form-fit connection element. Accordingly, the friction-locked connection 30 comprises a first and a second friction-locked connection element.

The first form-fit connection element is formed by a circumferential groove 5 molded into an outer lateral surface 4 of the glass piston 3. A fastening ring 6, which is arranged in the circumferential groove 5, forms the second form-fit connection element.

Figure 6:
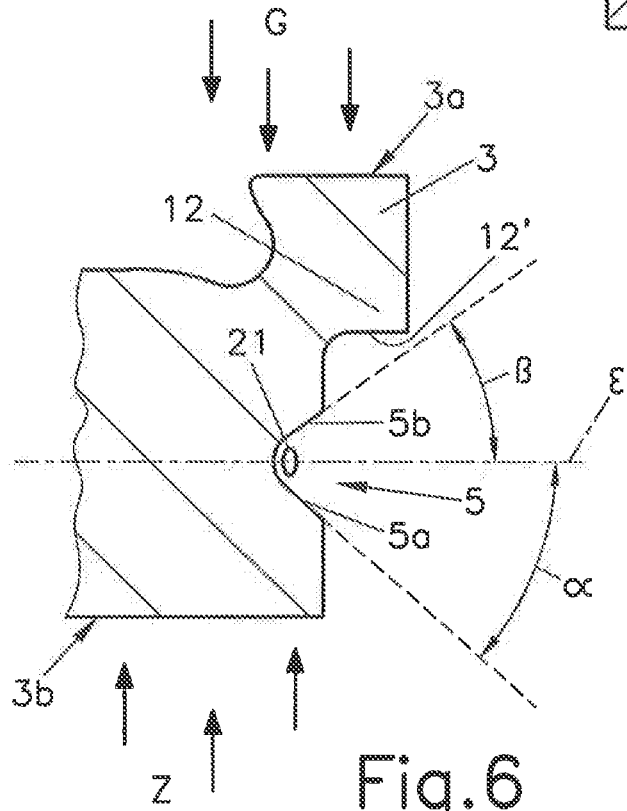
FIG. 6 shows a glass piston in detail in a meridian section.

The circumferential groove 5 is embodied in the illustrated exemplary embodiments as a wedge groove, so that in the event of a thermal expansion of the fastening ring 6, a friction-locked connection to the ring carrier 2 is maintained. FIG. 6 shows an illustration of the glass piston 3 without fastening ring 6. The wedge groove has first 5a and second wedge faces 5b facing toward one another, wherein the second wedge face 5b has a lesser distance to a gas-pressure-side front 3a of the glass piston 3 than the first wedge face 5a. The gas-pressure-side front 3a of the piston 1 or of the glass piston 3 faces toward the combustion chamber B in the installed state and gas forces G are applied thereto in operation. The first wedge face 5a spans a first wedge angle $\alpha$ with a normal plane $\epsilon$, which extends perpendicularly to the piston axis 100 extending in the stroke direction of the piston 1 (see FIG. 1 and FIG. 3), and the second wedge face 5b spans a second wedge angle $\beta$ with the normal plane $\epsilon$. The first wedge angle $\alpha$ is between approximately 30° and 70°, preferably between approximately 40° and 60°, for example, approximately 52°. The transition between first 5a and second wedge face 5b is embodied as essentially rounded for reasons of manufacturing and strength—the fastening ring 6 contacts the glass piston 3 on the two wedge faces 5a, 5b, but not in the transition region, which can be used, for example, for receiving adhesive (adhesive bond 21 indicated) and therefore for producing a rotationally-fixed connection between fastening ring 6 and glass piston 3.

The wedge shape of the wedge groove is embodied so that the force introduction into the glass piston 3 does not exceed a critical amount. Tensile stresses in the glass piston 3 can thus be kept within a permissible range, whereby cracks and fractures—in particular as a result of centripetal forces Z acting on the piston 1—are avoided. The second wedge angle ϵ, which helps to ensure the form-fit against the gas forces G, can be embodied substantially arbitrarily within the possible geometric range.

Figure 2:
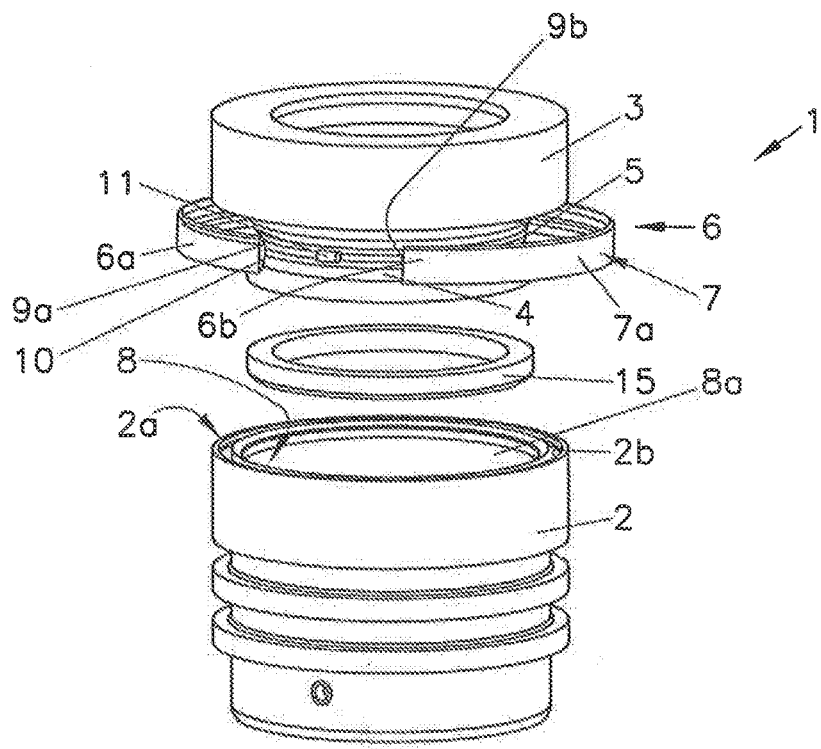
FIG. 2 shows this piston in an exploded illustration.
Figure 3:
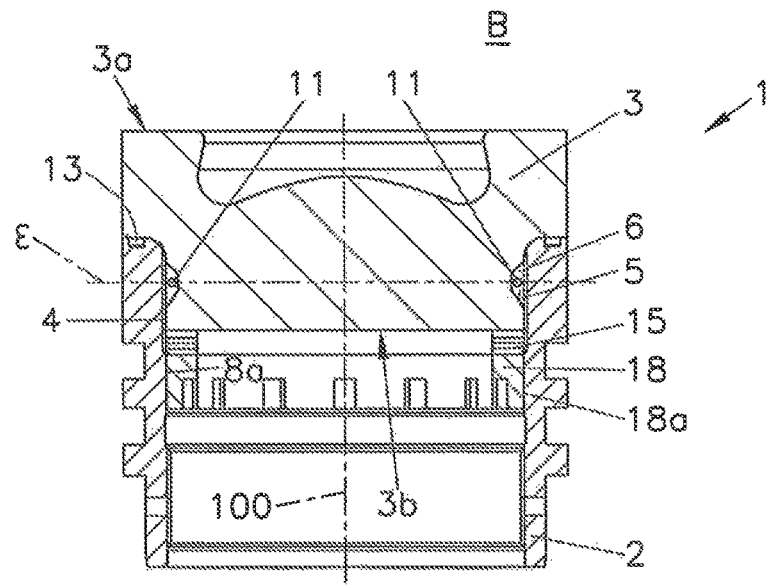
FIG. 3 shows a piston according to the invention in a meridian section in a second embodiment variant.
Figure 4:
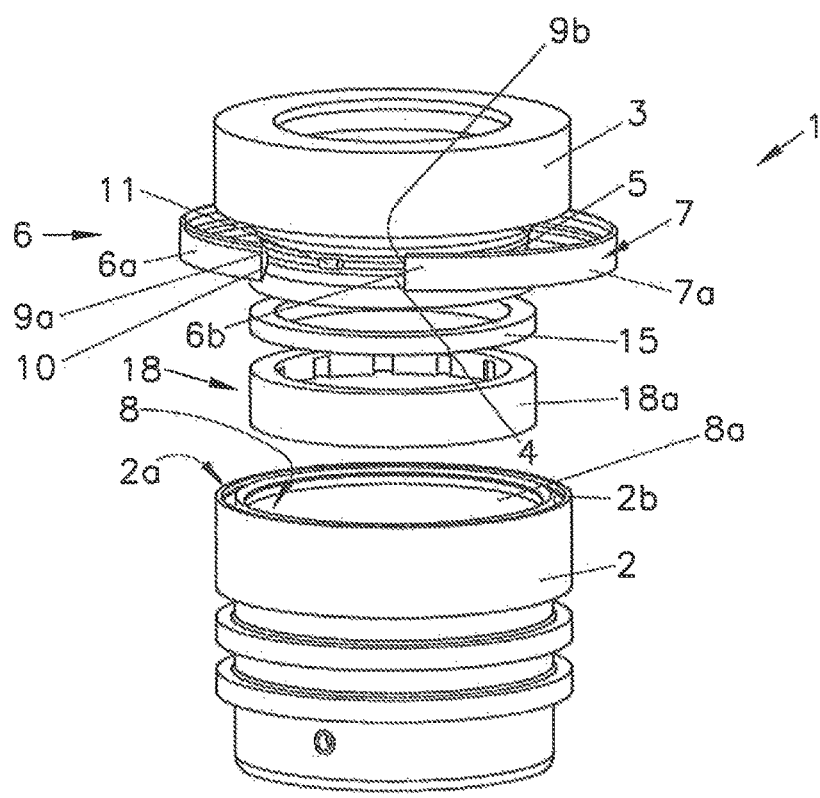
FIG. 4 shows this piston in an exploded illustration.

The fastening ring 6 is formed reciprocally to the circumferential groove 5 and consists in the exemplary embodiments of two ring segments or parts 6a, 6b (FIG. 2 and FIG. 4), which are joined together in the region of joining faces 9a and 9b. Transversely to the joining faces 9a, 9b—for example, perpendicularly to the joining faces 9a, 9b boreholes 10 are formed in the ring segments 6a, 6b to receive a connecting pin 11. FIG. 1 and FIG. 3 show sectional illustrations having the section in the region of the joining faces 9a, 9b. The two ring parts 6a, 6b are positioned in relation to one another and connected to one another by the connecting pins 11. The fastening ring 6 can also be formed by an integral ring, however, which is severed at least one point—preferably completely. The fastening ring 6 is manufactured from aluminum, for example.

The fastening ring 6 is stretched onto the glass piston 3, which is embodied having the circumferential groove 5, and optionally connected in a rotationally-fixed manner to the glass piston 3, to avoid unintentional twisting of the fastening ring 6 in the circumferential groove 5 during the mounting. The rotationally-fixed connection can be formed, for example, by an adhesive bond 21 (the adhesive bond is indicated in FIG. 6).

The form-fit connection 20 is thus formed by the first form-fit connection element in the form of the circumferential groove 5, which works together with the fastening ring 6 functioning as the second form-fit connection element. The fastening ring 6 is received in the circumferential groove 5 (preferably in a rotationally-fixed manner, for example, by gluing).

The friction-locked connection 30 is formed in the exemplary embodiments by a screw connection between fastening ring 6 and ring carrier 2. The ring carrier 2 is provided in the region of its inner lateral surface 8 with an internal thread (not shown in the figures—located in the region marked with the reference sign 8a), which functions as the first friction-locked connection element. The fastening ring 6 has the second friction-locked connection element in the form of an external thread embodied on its outer lateral surface 7 (not shown in the figures, but marked by reference sign 7a).

The glass piston 3, together with the fastening ring 6, is screwed into the ring carrier 2 from the side of the ring carrier 2 facing toward the combustion chamber during use, wherein the external thread 7a (second friction-locked connection element) of the fastening ring 6 engages in the internal thread 8a (first friction-locked connection element) of the inner lateral surface 8 and produces a friction-locked connection 30.

The glass piston 3 has a first, upper (combustion-chamber-side or gas-pressure-side) glass piston portion 3' and a second, lower glass piston portion 3", which adjoins the side of the first glass piston portion 3' facing away from the combustion chamber B. By means of the fastening ring 6 positioned on the second glass piston portion 3" in the illustrated exemplary embodiment, the glass piston 3 is screwed into the ring carrier 2 so that the first glass piston portion 3' protrudes out of the ring carrier 2 and the second glass piston portion 3" is located inside the ring carrier 2 and is enclosed by the ring carrier 2.

In the illustrated exemplary embodiment, the glass piston 3 has different diameters $D_1$, $D_2$ in each case. The first, upper diameter $D_1$ of the first, upper glass piston portion 3' is larger in this case than the second, lower diameter $D_2$ of the second, lower glass piston portion 3". A projection 12 in the form of a contact surface 12' formed perpendicularly to the piston axis 100 is provided between the upper 3' and the lower glass piston portion 3" (see FIG. 6). The projection 12 is embodied as a substantially ring-shaped shoulder. In a meridian section (see, for example, FIG. 1 or FIG. 3), the glass piston 3 thus has a T-shaped cross section. The ring carrier 2 has, on its gas-pressure-side end, a ring front 2a corresponding to the contact surface 12' of the glass piston 3, so that the glass piston 3 is screwed with its side facing away from the combustion chamber into the ring carrier 2 so that the contact surface 12' rests on the corresponding ring front 2a. The lower glass piston portion 3", which has the fastening ring 6, is completely enclosed by the ring carrier 2. The upper glass piston portion 3' protrudes beyond the ring carrier 2. The best possible observation of the combustion procedures inside the combustion chamber B through the glass piston 3 is ensured by this arrangement of the glass piston 3 in the ring carrier 2 and the embodiment of the glass piston 3.

A seal element 13, for example, a silicone seal or a seal ring, is arranged between the contact surface 12' and the ring front 2a of the ring carrier 2. The ring front 2a can have a circumferential seal groove 2b in this case for receiving the seal element 13 and therefore for making the mounting easier.

The region between glass piston 3 and ring carrier 2 is sealed against foreign bodies via the seal element 13, without additional force being introduced into the glass piston 3.

The glass piston 3 is therefore connected in a form-fit and friction-locked manner to the ring carrier 2 via the fastening ring 6 in the illustrated exemplary embodiment. The fastening ring 6 thus represents a connection element, which holds the glass piston 3 in the ring carrier 2, in that it is connected to the glass piston 3 via a form-fit connection 20 and to the ring carrier 2 via a friction-locked connection 30. This enables simple mounting, which, in spite of the different thermal expansions of the individual components occurring in operation, enables an optimum, low-tension connection of glass piston 3 and ring carrier 2.

The low-tension mounting is assisted by the following measures:

A counter holder element 16 is provided in the interior of the ring carrier 2, against which the gas-pressure-averted rear 3b of the glass piston 3 presses. An expansion ring 15, which is preferably manufactured from a material which has a greater thermal expansion than steel, is arranged between the rear 3b and the counter holder element 16. The glass piston 3 is thus supported with its rear 3b, which faces away from the combustion chamber B, via an expansion ring 15 made of aluminum on the counter holder element 16.

A friction lock between the glass piston 3 and the ring carrier 2 is caused and maintained by the expansion ring 15, even if one of the two connection partners (typically the ring carrier 2 manufactured from steel) expands or contracts due to heat action. The glass piston 3 or the fastening ring 6 is thus only pressed in one direction against the flanks of the thread of its friction-locked connection and therefore alternating loads and a back and forth movement ("rattling") of the glass piston 3 in the friction-locked connection 30—which could result in tensions and fractures in the glass piston—are avoided. A further auxiliary seal element 14 (see FIG. 5), for example, a standard seal made of spring steel, can optionally be arranged as a compensation element between the expansion ring 15 and the glass piston 3, to avoid damage to the glass piston 3, if detachment occurs due to tilting of the glass piston 3, for example.

In a first variant (see FIG. 1, FIG. 2, and FIG. 5), the counter holder element 16 can be integrally formed with the ring carrier 2 and can be formed by a shoulder 17 protruding from the inner lateral surface 8 of the ring carrier 2. This shoulder 17 can be divided in this case into individual circumferential sectors, which are spaced apart along the inner circumference of the ring carrier 2, but can also be embodied circumferentially.

In a second variant (FIG. 3 and FIG. 4), the counter holder element 16 is formed by a counter screw connection 18. The counter screw connection 18 has an external thread, which is identified with reference sign 18a, on its outer side, using which it is screwed into an internal screw connection, which is indicated with reference sign 8a, of the inner lateral surface 8 of the ring carrier 2. The glass piston 3 is thus screwed by means of the fastening ring 6 into the ring carrier 2, until it presses against the expansion ring 15 mounted on the counter holder element 16. If the counter holder element 16 is formed as a counter screw connection 18, the glass piston 3 does not have to be completely screwed in, but rather the fixation can be ensured by tightening the counter screw connection 18. Retightening of the glass piston 3 during operation is thus also possible if necessary.

The invention claimed is:

1. A piston having a ring carrier and a glass piston for observing procedures in a combustion chamber of an internal combustion engine, wherein the glass piston is placed on the ring carrier and is fixedly connected thereto in a region of an inner lateral surface of the ring carrier, wherein the glass piston is connected to the ring carrier via at least one form-fit connection, wherein the glass piston rests on its gas-pressure-averted rear on at least one expansion ring, which is supported via at least one counter holder element on the ring carrier, wherein the counter holder element is formed by a counter screw connection, which is detachably connected in a friction-locked manner to an inner lateral surface of the ring carrier.

2. The piston according to claim 1, wherein the glass piston is connected to the ring carrier via at least one form-fit connection and is connected via a friction-locked connection, which is detachably connected in a friction-locked manner to the inner lateral surface of the ring carrier.

3. The piston according to claim 2, wherein the friction-locked connection is formed by the at least one fastening ring and the ring carrier.

4. The piston according to claim 3, wherein the friction-locked connection has an external thread on the outer lateral surface of the fastening ring and a corresponding internal thread of the inner lateral surface of the ring carrier, wherein the fastening ring is screwed via the external thread into the internal thread of the ring carrier.

5. The piston according to claim 1, wherein the form-fit connection is formed by the glass piston and at least one fastening ring.

6. The piston according to claim 5, wherein the fastening ring is integrally formed.

7. The piston according to claim 5, wherein the fastening ring is severed at at least one point.

8. The piston according to claim 7, wherein the fastening ring is severed completely.

9. The piston according to claim 5, wherein the fastening ring is formed by at least two ring segments which are connected to one another in the region of joining faces facing toward one another.

10. The piston according to claim 9, wherein said at least two ring segments are connected to one another via at least one connection pin arranged in boreholes of the joining faces.

11. The piston according to claim 9, wherein the fastening ring is connected in a rotationally-fixed manner to the glass piston.

12. The piston according to claim 1, wherein the rotationally-fixed connection is formed by an adhesive bond or a further form-fit connection.

13. The piston according to claim 5, wherein the fastening ring consists of aluminum.

14. The piston according to claim 1, wherein the form-fit connection has at least one circumferential groove in a region of an outer lateral surface of the glass piston, in which the fastening ring formed reciprocally corresponding to the circumferential groove is arranged.

15. The piston according to claim 14, wherein the circumferential groove is embodied as a wedge groove, so that in the event of a thermal expansion of the fastening ring, a friction-locked connection to the ring carrier is maintained.

16. The piston according to claim 15, wherein the wedge groove has first and second wedge faces facing toward one another, wherein the first wedge face has a lesser distance to a gas-pressure-side front of the glass piston than the second wedge face.

17. The piston according to claim 16, wherein the first wedge face spans a first wedge angle with a normal plane on the piston axis of the piston, wherein the first wedge angle is between approximately 30° and 70°.

18. The piston according to claim 17, wherein the first wedge angle is between 40° and 60°.

19. The piston according to of claim 1, wherein the glass piston has a ring-shaped projection, wherein a ring-shaped contact surface arranged perpendicularly to the piston axis is formed in the region of the projection.

20. The piston according to claim 19, wherein the contact surface rests on a frontal ring front of the ring carrier.

21. The piston according to claim 20, wherein the at least one seal element, particularly preferably a silicone seal, is arranged between the glass piston and the ring carrier.

22. The piston according to claim 21, wherein the said least one seal element is a silicone seal.

23. The piston according to of claim 19 wherein the ring-shaped projection adjoins the circumferential groove on the combustion chamber side.

24. The piston according to claim 1, wherein the expansion ring consists of aluminum.

25. The piston according to claim 1, wherein the counter holder element is formed by a shoulder protruding from the inner lateral surface of the ring carrier.

26. The piston according to claim 1, wherein the ring carrier is formed as a cylindrical element, which is embodied as internally hollow, having an inner lateral surface and an outer lateral surface.

27. The piston according to claim 1, wherein the glass piston has a gas-pressure-side, first glass piston portion, which is adjoined on the side facing away from the combustion chamber, by a second glass piston portion, wherein the first glass piston portion protrudes on the gas-pressure side out of the ring carrier and the second glass piston portion is located inside the ring carrier.

* * * * *